United States Patent [19]

Torbet et al.

[11] E Re. 31,131

Best Available Copy [45] Reissued Jan. 25, 1983

[54] CONCRETE SLAB HOISTING APPARATUS

[75] Inventors: Philip A. Torbet, Port Washington, N.Y.; Thomas Eager, San Anselmo, Calif.

[73] Assignee: The Burke Company, San Mateo, Calif.

[21] Appl. No.: 935,513

[22] Filed: Aug. 21, 1978

Related U.S. Patent Documents

Reissue of:

[64] Patent No.: 4,068,879
Issued: Jan. 17, 1978
Appl. No.: 704,368
Filed: Jul. 12, 1976

[51] Int. Cl.[3] ..... B66C 1/66

[52] U.S. Cl. ..... 294/89; 52/125.3; 52/707; 294/86 R

[58] Field of Search ..... 81/177 UJ; 52/125, 583, 52/587, 601, 704, 706–708; 294/89, 93, 94, 96, 86 R

[56] References Cited

U.S. PATENT DOCUMENTS

| | | | |
|---|---|---|---|
| 3,431,012 | 3/1969 | Courtois et al. | 52/706 |
| 3,596,971 | 8/1971 | Courtois et al. | 294/89 |
| 3,698,756 | 10/1972 | Groves | 294/96 |
| 3,993,341 | 11/1976 | Bentley | 294/89 |
| 4,075,913 | 2/1978 | Tye | 81/177 UJ |

FOREIGN PATENT DOCUMENTS

| | | | |
|---|---|---|---|
| 1961879 | 6/1971 | Fed. Rep. of Germany | 52/125 |

*Primary Examiner*—James G. Smith
*Attorney, Agent, or Firm*—Naylor, Neal & Uilkema

[57] ABSTRACT

A socket cavity formed in a concrete slab of the type poured horizontally and subsequently tilted up, which cavity affords engagement of hoisting equipment to the slab. The inner portion of the cavity is in the form of a frusto-conical wall surface communicating with the surface of the cavity through a cylindrical bore concentric with the frusto-conical surface. The cavity is formed by placing in the slab form an expendable flask-like hollow article formed of synthetic resin or the like which is left in the slab after erection thereof. Engaging apparatus cooperable with the cavity which has on the inner end thereof arms that are pivotally moveable between a retracted position and an extended position, the arms engaging the frustoconical wall of the cavity when in the extended position. The apparatus includes mechanism at the outer end thereof for effecting retraction or extension of the arms, the mechanism being remotely operable so as to afford disengagement of the hoisting mechanism from the slab from a remote location after erection of the slab.

11 Claims, 7 Drawing Figures

CONCRETE SLAB HOISTING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to apparatus for engaging a concrete slab during hoisting of the same.

2. Description of the Prior Art

U.S. Pat. Nos. 361,927; 560,329; 880,962 and 2,563,164 disclose "Lewises" which cooperate with a dovetail shaped slot in a block of building stone to afford a grip on the stone.

U.S. Pat. No. 3,652,118 discloses a lifting anchor for concrete slabs which employs a wedge engageable with a socket cast in the concrete slab.

U.S. Pat. No. 3,590,538 discloses a threaded socket cast into a concrete slab which can be engaged by a threaded bolt.

U.S. Pat. Nos. 3,431,012; 3,596,971 and 3,705,469 disclose concrete slab engaging devices which are operated by rotation of a hoisting member relative to a socket formed in the slab.

Copending commonly assigned U.S. application Ser. No. 641,529 filed Dec. 17, 1975 discloses a socket formed in a concrete slab and a mechanism for effecting selective engagement in the socket for hoisting the slab.

SUMMARY OF THE INVENTION

According to the present invention there is formed in a concrete slab by an expendable low cost member a socket cavity having an inner end which is of frusto-conical form and which communicates through a coaxial cylindrical portion to the surface of the slab. When concrete of which the slab is formed has set, a high strength socket for engagement by a hoisting mechanism is formed. The invention provides such engagement mechanism which can be quickly inserted into the socket to afford a grip on the slab to permit hoisting of the same for transportation and erection at the construction site.

An object of the invention is to provide a socket cavity of the type referred to above which can be formed quickly and economically in a concrete slab. This object is achieved by forming an expendable hollow member having a shape corresponding to the socket, placing one or more of the hollow members in the slab form prior to introduction of fluid concrete thereinto and then pouring the concrete.

A feature and advantage afforded by the invention is that the hollow member is concentric with a central axis so that the loading from the fluid concrete thereon is sufficiently uniform that relatively thin lightweight and inexpensive material, such as synthetic resin material, can be employed.

Another object is to provide a reuseable socket engaging mechanism cooperable with the socket formed as described above which can be quickly and conveniently engaged without attention to rotative orientation within the socket. This object is achieved because of the symmetry of the above mentioned frusto-conical portion and the symmetry of the engaging mechanism. Achievement of this object is facilitated because the engaging mechanism employs two or more uniformly spaced apart arms and a simple mechanism for pivoting the arms from a retracted position to a protruding position at which they engage the inner wall of the frusto-conical portion of the socket formed as described above.

A further object is to provide an engaging mechanism which can be disengaged from a remote site. The importance of achieving this object can be appreciated by considering that when a slab reaches its final position at a construction site, the engaging members are typically located well above ground level so that the ability to free the engaging mechanisms from a remote location eliminates the necessity for employing a ladder or the like to gain access to the engaging mechanisms. This object is achieved in the present invention by providing an axially moving operating rod which cooperates with the above mentioned arms so that upon axial movement of the rod the arms are retracted. On the outer end of the structure is a pivot lever which can be pivoted by force on a lanyard secured thereto so as to effect disengagement of the arms and consequent ready removal of the engaging mechanism from the slab socket.

The foregoing together with other objects, features and advantages will be more apparent after referring to the following specification and the accompanying drawings.

DESCRIPTION OF THE PREFERRED EMBODIMENT

Figure 1:
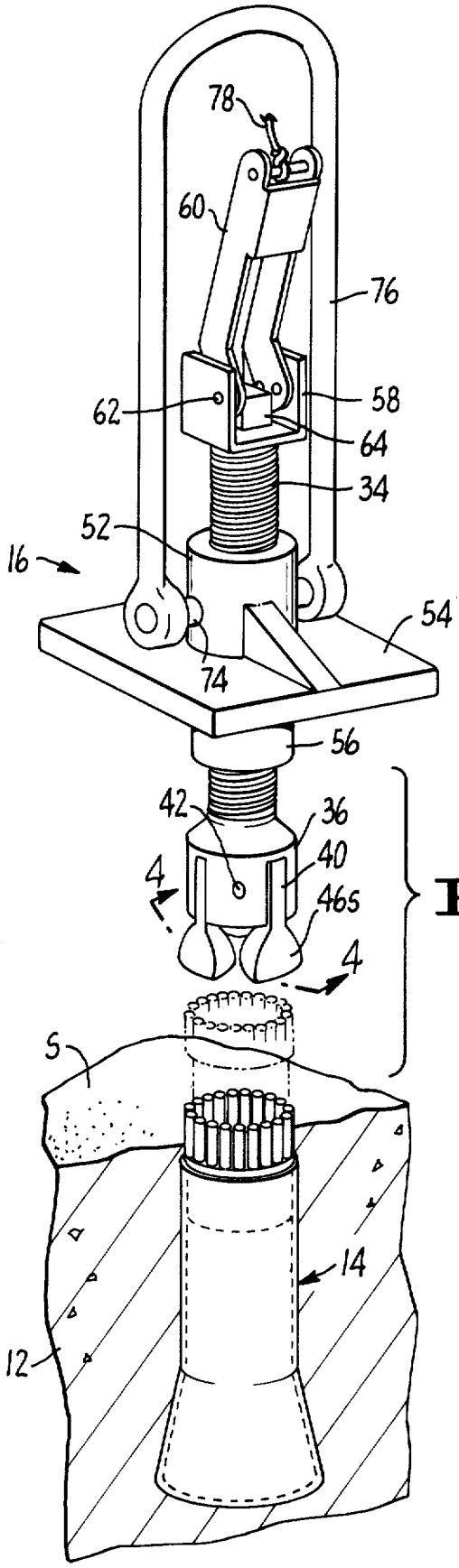
FIG. 1 is an exploded perspective view of a slab socket and engaging mechanism according to the invention.

Referring more particularly to the drawings reference numeral 12 indicates a concrete slab in which is formed in accordance with the invention a socket cavity indicated generally at 14, the interior of which cavity is accessible from a surface S of slab 12. A socket engagement mechanism 16 is arranged for selective engagement and disengagement with the walls of socket cavity 14 and has facilities for engagement by a hoisting line during transportation and erection of the slab.

For forming socket cavity 14, the invention provides a hollow flask 18 which is preferably constructed of low cost material such as molded synthetic resin. The flask includes a cylindric neck portion 20 which is integral and concentric with a frusto-conical portion 22. Spanning the end of frusto-conical portion 22 remote from cylindrical portion 20 is a circular end wall 24, also preferably integral with the frusto-conical portion 22.

Figure 2:
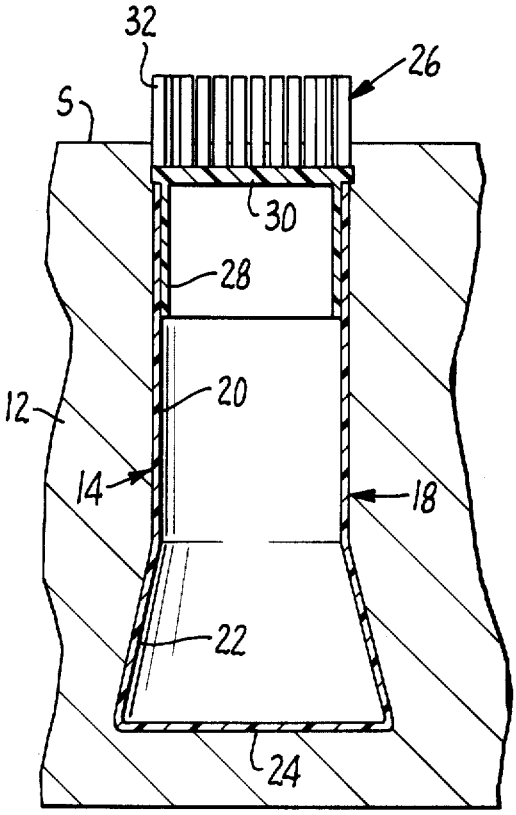
FIG. 2 is a cross-sectional elevation view of a concrete slab having a socket formed therein in accordance with the invention.
Figure 3:
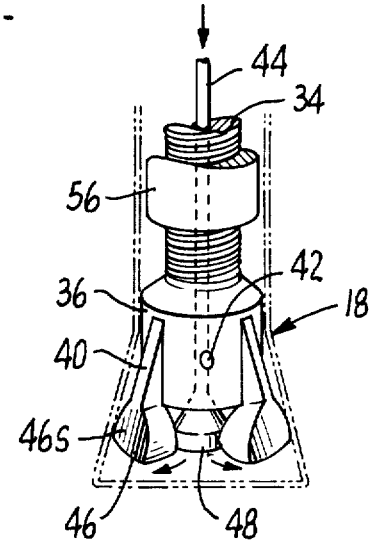
FIG. 3 is a fragmentary perspective view of the socket engaging means of the invention engaged in the socket.

End wall 24 defines the inner end of the hollow cavity defined by flask 18. The conical angle of frusto-conical portion 22 with respect to the cylindric axis of cylindric portion 20 is, in the embodiment shown in FIG. 2, approximately 13°. This angle is large enough to afford firm engagement with the cavity (by mechanism described hereinbelow) but small enough to avoid imposing substantial shear stresses on the concrete in slab 12 above the conical wall portion. The preferred range of conical angles is 13° plus or minus 3°, that is, from about 10° to about 16°.

During formation of slab S, it is essential to exclude fluid concrete from entry into the cavity defined by flask 18. For closing the end of the flask opposite end wall 24 there is a plug 26. As described in the above cited copending application, the plug is formed of impervious plastic material and has a cylindric wall portion 28 which is sized for a telecoping substantially fluid tight fit within cylindric wall portion 20 of the flask. Cylindric wall portion 28 is integral with and depends from an impervious circular disc 30 from the upper periphery of which extend a plurality of fingers 32. The fingers are of sufficiently small size that they are deformable so that in pouring the concrete up to a level coincident with surface S, the fingers deform or yield when finishing tools are moved over the surface. Moreover, the fingers, because they are spaced apart from one another, form a circular perforated line between concrete interior of the fingers and the concrete exterior thereof, wherefore the plug can be located and removed when the concrete has hardened.

Figure 4:
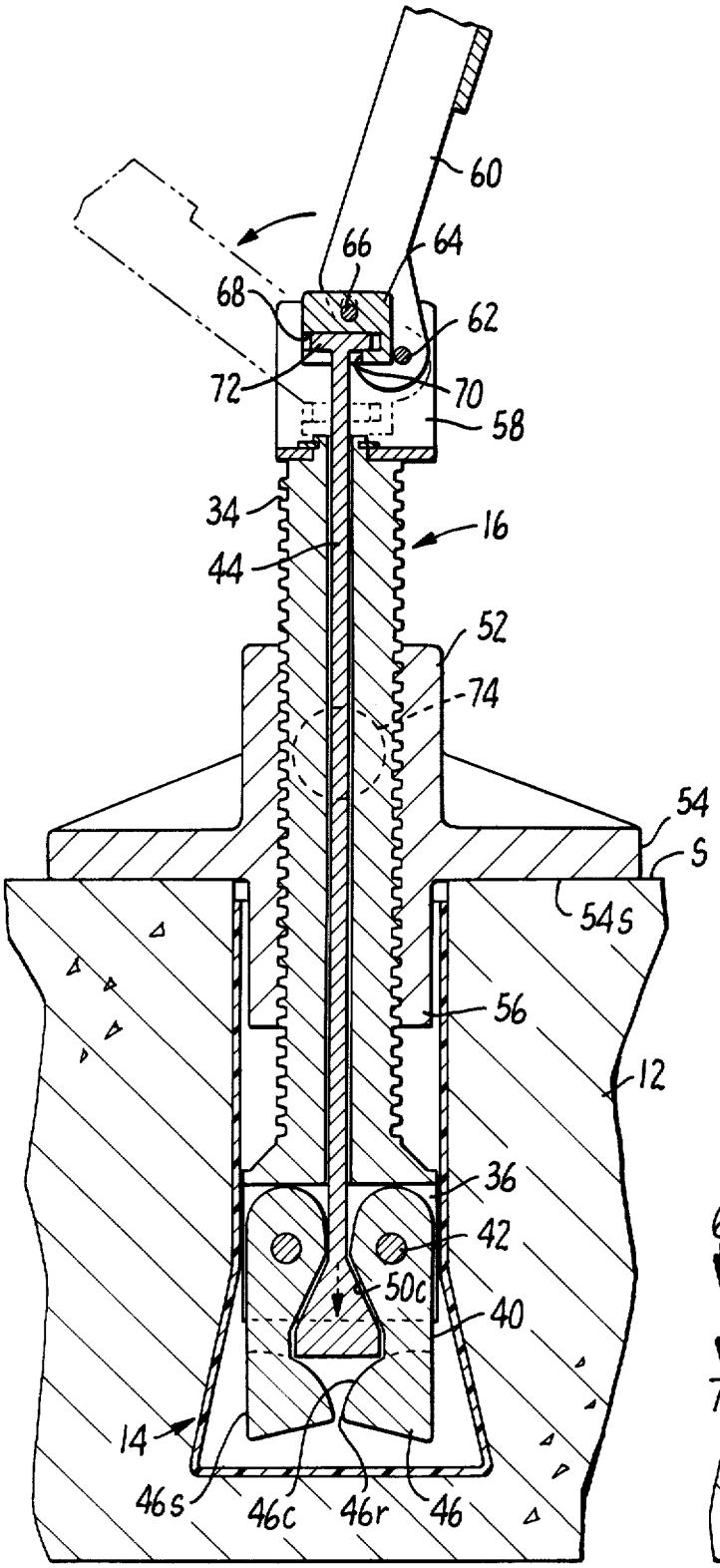
FIG. 4 is a cross-sectional view in elevation taken along an arcuate plane designated by line 4—4 of FIG. 1 and showing the engaging mechanism in place in the socket cavity in a disengaged position.
Figure 5:
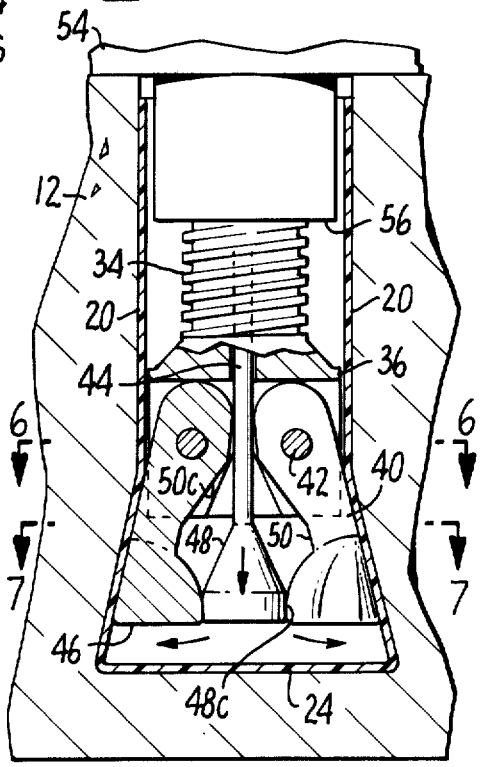
FIG. 5 is a fragmentary view similar to FIG. 4 showing the engagement mechanism in an engaged position.

A slab 12 with one or more cavities 14 formed therein can be quickly engaged for hoisting by socket engagement mechanism 16. The socket engagement mechanism 16 includes a main shaft 34 having a diameter less than the diameter of cylindric wall portion 20 of flask 18 and the cavity formed by the flask. Rigid with the inner end of shaft 34 is cylindric enlargement 36 which has a diameter substantially equal to the inner diameter of cylindric portion 20 of the socket cavity so that the enlargement and the main shaft are supported substantially concentrically of the cavity. Enlargement 36 is formed with a plurality of uniformly spaced apart radially extending slots 38 in each of which an arm 40 is pinned by a pin 42 to afford pivotal movement of the arm between a retracted position (FIG. 4) and extended position (FIG. 5). Because arms 40 are identical, the description of one should be considered the description of all.

Figure 6:
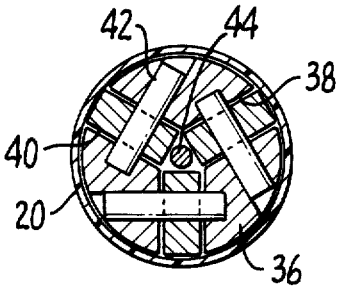
FIG. 6 is a cross-sectional view taken along a plane designated by line 6—6 of FIG. 5.
Figure 7:
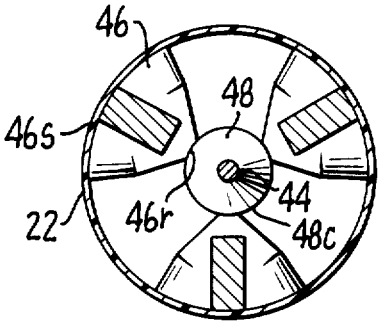
FIG. 7 is a cross-sectional view taken along a plane designated by line 7—7 of FIG. 5.

As can be seen most clearly in FIG. 6, the inner radial extremities of arms 40 are foreshortened so as to define a central space to accommodate an operating rod 44. The lower free ends of arms 40 extend below enlargement 36 and the arms each define distally of pin 42 a sector shaped portion or sector 46. Each sector 46 has an exterior arcuate surface 46S which, as can be seen in FIGS. 5 and 7, conforms to the curvature of the inner surface of frusto-conical surface portion 22 of cavity 14. Each sector 46 also has an inward facing curvilinear camming surface 46C which cooperates with a distal cylindric portion 48C of conical cam 48 that is rigid and preferably integral with rod 44. At the distal extremities of respective curvilinear camming surfaces 46D there are concave arcuate surface regions 46R, each of which is configured to reside coaxially of cylindric portion 48C of conical cam 48. Each arcuate surface region 46R merges smoothly into curvilinear camming surface 46C so that outward axial movement of the conical cam moves arms 40 to the extended position. The radius of curvature of arcuate surfaces region 46R is equal to that of cylindric portion 48C of conical cam 48 so that when arms 40 are moved to the extended position there is a frictional, surface-to-surface contact between the concave arcuate region 46R and cylindric portion 48C. The inner surface of each sector 46 is excised or relieved at 50 to define a camming surface 50C having a configuration corresponding to conical cam 48 so that the arms are moved to a retracted position shown in FIG. 4 when rod 44 and cam 48 are moved inward.

Shaft 34 is externally threaded for threaded enagement with an internally threaded collar 52 so that the collar can be axially positioned along shaft 34 by rotation of the collar with respect to the shaft. Integral with the collar is a flange 54, the lower surface 54S of which is normal to the axis of shaft 34 so that surface 54S can bear against slab surface S to position the inner end of engaging mechanism 16 in an appropriate location for engagement with frusto-conical wall surface 22. Projecting perpendicularly of flange surface 54S is a collar extension 56 which has an outer diameter corresponding to the inner diameter of cylindric portion 20 of the cavity so that in the position shown in FIG. 4, rod 34 will be supported substantially concentric with the axis of cylindric portion 20.

Rigid with the outer or upper end of rod 34 is a U-shaped stirrup 58 which supports an operating lever 60 for pivotal movement about the axis of aligned pins 62. The inner end of lever 60 is bifurcated, and between the furcations is supported a block 64 by means of a pin 66 which extends through the block and the furcations.

Because the axis of pins 62 is spaced from the axis of pin 66, pivotal movement of lever 60 about the axis of pin 62 effects vertical movement of block 64. Block 64 defines a horizontally oriented slot 68 which is intersected by a vertically extending opening 70, the opening 70 having an extent larger then the diameter of operating rod 44 which extends through the opening. The upper extremity of operating rod 44 has an enlarged head 72 which resides within slot 68. Head 72 is of lesser vertical extent than slot 68 so as to avoid interference with lateral movement of block 64 in response to pivotal movement of lever 60. For affording a grip on engagement mechanism 16 during hoisting of a concrete slab with which the mechanism is engaged, there are diametrically extending stub shafts 74 rigid with collar 52. Pivotally secured on the outer ends of the stub shafts is a U-shaped bail 76 which has a vertical extent sufficient to clear lever 60.

In operation, one or more flasks 18, each supplied with plug 26, are disposed in a concrete form which is typically oriented in a flat or horizontal position. The flasks are positioned so that the upper surface of the finished slab to be poured into the form will reside at a position above the mouth of flask 18 by a distance approximately equal to ⅓ of the length of fingers 32. Thereafter, the concrete is placed and finished, the deformability of the fingers avoiding interference during the finishing process. When the concrete has cured or hardened, plugs 26 are removed, an operation which can be performed easily because of the perforations formed around the concrete overlying the socket opening.

When it is desired to hoist the slab containing one or more cavities 14 formed as described above, a corresponding number of socket engaging mechanisms 16 are employed, one in association with the cavity. It is preferred that collar 52 and integral plate 54 are rotated so as to move the collar and plate upward on shaft 34. Next lever 60 is moved to the position shown in solid lines in FIG. 4 so as to retract arms 40 and to permit entry of the mechanism into the cavity. Cooperation between conical cam 48 and camming surfaces 50C on the inner surfaces of arms 40 retracts the arms when rod 44 is moved upward. When socket engagement mechanism 15 is inserted into the cavity to an extent that arms 40 reach the bottom of the cavity and contact circular end wall 24, lever 60 is pivoted in a counterclockwise direction, as viewed in FIG. 4, so as to move rod 44 and cam 48 downward thereby to move arms 40 to the projecting position as seen in FIG. 5. Next collar 52 and integral plate 54 are threaded downward along shaft 34 until surface 54S contacts slab surface S. Further turning of the collar and plate move shaft 34 and projecting arms 40 upward into firm engagement with frusto-conical wall portion 22 within the cavity. The socket engagement mechanism 16 is thus firmly engaged and hoisting can proceed by engaging a hoisting line with bail 76. As can be seen most clearly in FIG. 7, exterior surfaces 46S of sectors 46 each has a circumferential extent of about 60° so as to afford a large area of contact between the socket engagement mechanism and the walls of the socket cavity.

It will be noted in FIG. 5 that there is a clearance space between the bottom of the cavity defined by circular end plate 24 and the axial extremity of sectors 46 of arms 40. This clearance space has the function of permitting extension of arms 42 into engagement with the frusto-conical walls of the cavity nothwithstanding the presence of particles of concrete within the cavity, such as might enter the cavity during removal of plug 22. Also assuring firm engagement of arms 40 with the frusto-conical wall of the cavity in the presence of concrete particles in the cavity is the fact that rod 44 moves outward in moving the arms to the extended position. Accordingly, the likelihood that the presence of small particles of concrete or like deleterious substances within cavity 14 will interfere with firm engagement with the walls of the cavity is extremely small.

The presence of cylindric surface 48C on cam 48 together with the arcuate configuration of surfaces 46C on sectors 46 assures secure engagement between socket engaging mechanism 16 and the walls of cavity 14, particularly when the parts are subjected to loading during hoisting of a slab. The foregoing can be appreciated most readily by reference to FIGS. 5 and 7. In such figures it will be noted that surfaces 46C have a substantial surface area of contact with cylindric surface 48C on cam 48. Because of the substantial area of surface contact and because of the substantial normal force arising from the weight of the slab, the frictional force between surfaces 46C and 48C is sufficiently great to reduce if not virtually eliminate the likelihood of disengagement from inadvertent axial movement of rod 44. When the normal force is reduced by slacking off on the hoisting line secured to bail 76, however, retraction of arms 40 and disengagement of the mechanism from the slab cavity can be readily effected by restoration of lever 60 to the solid line position shown in FIG. 4. The foregoing movement of lever 60 can be achieved from a remote location, i.e. from ground level, by application of tension to a lanyard 78 (see FIG. 1) that is attached to the free or distal end of lever 60.

Thus it will be seen that the present invention provides an inexpensive and efficient mechanism for hoisting concrete slabs during transportation and erection thereof. The low expense follows from the fact the flask 18, an expendable part, is formed of molded synthetic resin of light weight and low cost. Because the flask is subjected to loading only until the concrete hardens and such loading is confined substantially to uniform compressive loading, the flask can be made of relatively light weight low strength material. Moreover, the frusto-conical shape, in addition to providing for firm engagement with socket engaging mechanism 16, firmly retains grout within the socket cavity which grout is typically placed therein after the slab is erected to its final position.

The socket engaging mechanism in cooperating with the cavity permits quick adjustment to accommodate for varying depths of socket cavities and can reside at any rotative position throughout a full 360° arc. Moreover, extension of arms 40 can be achieved when the arms are in an unloaded condition because of the clearance space between the axial extremity of the arms and the lower wall of the cavity; the amount of force necessary to move lever 60 to the engaged position is thus minimized. Finally, the fact that the lever traverses an arc of less than about 90° between the engaged and disengaged position permits the socket engaging mechanism to be disengaged from the remote location thereby eliminating the time and expense of obtaining a ladder or the like to remove the mechanism once the slab is hoisted into place.

Although one embodiment of the invention has been shown and described it will be obvious that other adaptations and modifications can be made without departing from the true scope and spirit of the invention.

What is claimed is:

1. Apparatus for engaging a concrete slab to hoist the same, said slab having a generally planar surface, said apparatus comprising in combination: a socket cavity in said slab, said cavity being elongated along an axis substantially normal to said surface and symmetrical about said axis, said cavity having a cylindric portion communicating with said surface and a frusto-conical portion below said surface accessible through said cylindric portion and coaxial therewith, said frusto-conical portion defining a wall that converges in a direction toward said surface; a shaft having a diameter less than said cylindric portion and a length greater than the depth of said cavity, said shaft having an inner end and an outer end, a cylindrical enlargement on said inner end defining a bearing surface of substantially the same diameter as said cylindric portion and being coaxial with said shaft; at least three arms secured to said inner end at equal angularly spaced positions therearound for pivotal movement between a retracted position to afford insertion and removal of said shaft relative said cavity and an extended position for engaging said frusto-conical wall; and means accessible from the outer end of said shaft for controllably moving said arms between a retracted position and an extended position.

2. Apparatus according to claim 1 wherein said cavity defining means comprises an impervious synthetic plastic hollow body having an interior shape corresponding to said cavity, said body being of generally uniform thickness and having an exterior surface in intimate contact with the concrete of the slab.

3. Apparatus according to claim 1 wherein the conical angle of said frusto-conical portion relative the axis of said cylindric portion is in the range of about 10°–16°.

4. Apparatus for engaging a concrete slab having a substantially planar surface and a symmetrical socket cavity having a cylindric portion normal to and opening onto said surface, said cavity having a frusto-conical portion communicating with and coaxial with said cylindric portion, said apparatus comprising a shaft having a diameter less than said cylindric portion and a length greater than the depth of said cavity, said shaft having an inner end and an outer end, a cylindrical enlargement on said inner end defining a bearing surface of substantially the same diameter as said cylindric portion and being coaxial with said shaft, means including at least three arms secured to said inner end at equal angularly spaced positions therearound for pivotal movement between a retracted position to afford insertion and removal of said shaft relative said cavity and an extended position for engaging said frusto-conical wall, and means accessible from the outer end of said shaft for controllably moving said arms between a retracted position and an extended position.

5. Apparatus according to claim 4 wherein said shaft has an externally threaded portion remote from said enlargement, a collar having interal threads engagable with the threaded portion of said shaft so as to position said collar along said shaft in response to rotation thereof and a flange rigid with said collar and having a surface normal to said shaft for bearing on said slab surface.

6. Apparatus according to claim 4 wherein said arms have arcuate external surfaces having the same curvature as said frusto-conical portion so as to effect engagement of said frusto-conical portion over a substantial surface area.

7. Apparatus according to claim 4 wherein said arm moving means comprises a rod, a bore centrally of said shaft for supporting said rod for axial movement within said bore, a cam rigid with the end of said rod adjacent said arms, said cam defining a cylindric surface portion concentric with said rod, said arms having inward facing curvilinear camming surfaces for cooperating with said cylindric surface portion of said cam so that outward axial movement of said cylindric surface portion of said cam along said curvilinear camming surfaces moves said arms radially outward to the extended position.

8. Apparatus according to claim 7 wherein said inward facing curvilinear surfaces define at the distal extremity of said arms concavefarcuate surfaces having a curvature corresponding to said cylindric surface portion of said cam, said arcuate surfaces having an area sufficient to frictionally engage said cylindric surface portion of said cam to inhibit axial movement of said rod when said cavity wall engaging means is engaged in said cavity and is in a loaded condition.

9. Apparatus according to claim 7 wherein said cam includes a frusto-conical surface portion axially inward of said cylindric surface portion and wherein each said arm defines an excision axially inward of said curvilinear camming surface, said excisions defining inward facing frusto-conical surface portions corresponding to said frusto-conical cam surface portion so that inward axial movement of said cam cooperates with the frusto-conical camming surfaces on said arms to radially move said arms to the retracted position.

10. Apparatus according to claim 6 wherein said arm moving means includes a lever, means for mounting said lever to the outer end of said shaft for pivotal movement about an axis normal to said shaft, and means for linking said rod to said lever so that said rod moves axially in response to pivotal movement of said lever.

*11. Apparatus for the releasable connection to a tubular member embedded in an object, the member defining an opening in the object and including an inwardly facing shoulder disposed interiorly of the opening, the apparatus comprising: plate means adapted to be placed across the opening and including an aperture for alignment with the opening; an elongate housing extending through the aperture and having an axial bore, the inner end of the housing being adapted for positioning in said opening, and including a laterally extending cutout, a locking lug carried by the housing for lateral movement within the cutout from a first position in which the lug is out of engagement with the shoulder to a second position in which a portion of the lug protrudes laterally from the housing into engagement with the shoulder; and actuating means slidably disposed in the bore for moving the lug between the first and second positions responsive to movement of the actuating means longitudinally in the bore between corresponding first and second positions; the actuating means including means for positively and mechanically locking the lug in its second position when the actuating means is in its second position.*

* * * * *